(12) United States Patent
Messner et al.

(10) Patent No.: US 7,905,510 B2
(45) Date of Patent: Mar. 15, 2011

(54) CURTAIN AIRBAG MODULE

(75) Inventors: Thomas Wayne Messner, Grand Blanc, MI (US); Brandon Scott Marriott, Waterford, MI (US); Nicole Wiggins, Southfield, MI (US); Paul Michael Smith, Davison, MI (US)

(73) Assignee: TK Holdings Inc., Auburn Hills, MI (US)

( * ) Notice: Subject to any disclaimer, the term of this patent is extended or adjusted under 35 U.S.C. 154(b) by 4 days.

(21) Appl. No.: 12/232,914

(22) Filed: Sep. 25, 2008

(65) Prior Publication Data
US 2009/0079172 A1    Mar. 26, 2009

Related U.S. Application Data

(60) Provisional application No. 60/960,349, filed on Sep. 26, 2007.

(51) Int. Cl.
*B60R 21/16* (2006.01)

(52) U.S. Cl. ............... 280/728.2; 280/730.2; 280/749

(58) Field of Classification Search ............... 280/730.2, 280/728.2, 749, 729, 728.1, 730.1
See application file for complete search history.

(56) References Cited

U.S. PATENT DOCUMENTS

| | | | | |
|---|---|---|---|---|
| 3,603,535 | A * | 9/1971 | DePolo | 244/121 |
| 5,202,831 | A * | 4/1993 | Blackburn et al. | 701/46 |
| 5,542,691 | A * | 8/1996 | Marjanski et al. | 280/728.2 |
| 5,899,486 | A * | 5/1999 | Ibe | 280/728.2 |
| 6,224,087 | B1 * | 5/2001 | Stutz et al. | 280/728.2 |
| 6,231,068 | B1 * | 5/2001 | White et al. | 280/728.2 |
| 6,485,048 | B2 * | 11/2002 | Tajima et al. | 280/728.2 |
| 7,125,038 | B2 * | 10/2006 | Gammill | 280/728.2 |
| 7,322,600 | B2 * | 1/2008 | Inoue et al. | 280/730.2 |
| 7,367,582 | B2 * | 5/2008 | Nishizawa | 280/730.2 |
| 7,407,182 | B2 * | 8/2008 | Aoki et al. | 280/730.2 |

\* cited by examiner

*Primary Examiner* — Eric Culbreth
(74) *Attorney, Agent, or Firm* — Foley & Lardner LLP

(57) ABSTRACT

A bus or motor-coach includes a curtain airbag module. The airbag module comprises a curtain airbag, a trim cover, a plurality of fasteners to attach the curtain airbag module to an interior bus component or side wall of the bus, and an inflator to inflate the curtain airbag.

20 Claims, 8 Drawing Sheets

US 7,905,510 B2

CURTAIN AIRBAG MODULE

CROSS-REFERENCE TO RELATED PATENT APPLICATIONS

This application claims priority to U.S. Provisional Application No. 60/960,349, filed Sep. 26, 2007, which is incorporated herein by reference in its entirety.

BACKGROUND

The present application relates generally to the field of airbags in vehicles. More specifically, the present application relates generally to the field of curtain airbags in buses or other large passenger vehicles.

Occupants of school buses, commercial buses, motor-coach buses, and other large passenger vehicles currently have limited protection during side impact crash events. Occupant protection is usually limited to seatbelts and the structure of the bus itself. Curtain airbags have not been introduced to buses because of various issues. Buses traditionally do not have interior trim components, meaning an airbag in a bus would be exposed to the occupants and tampering of the airbag could be possible. Also, there are no curtain airbags designed to protect occupants in the unique geometry of a bus, such as high bench seats, unique seat spacing, and 0 to ten degree plane vertical side walls. There is not currently a curtain airbag system that meets a 0.51 to 0.8 stowed curtain package to deployed curtain airbag ratio that would be recommended for use in a bus. Additionally, deployed airbags may prevent proper egress of a bus.

Therefore, it would be advantageous to provide an improved mechanism for protecting occupants, using curtain airbags, of a bus during side impact crash events while avoiding the issues listed above. Additionally, what is needed is a system to selectively deploy curtain airbags based on where the collision occurred.

SUMMARY

One exemplary embodiment relates to a curtain airbag module for a bus. The airbag module comprises a curtain airbag, a trim cover, a plurality of fasteners to attach the curtain airbag module to an interior bus component or side wall of the bus, and an inflator to inflate the curtain airbag.

Another exemplary embodiment relates to a bus. The bus comprises a plurality of seats and a plurality of curtain airbag modules. The modules each include a curtain airbag, an inflator, and a trim component.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
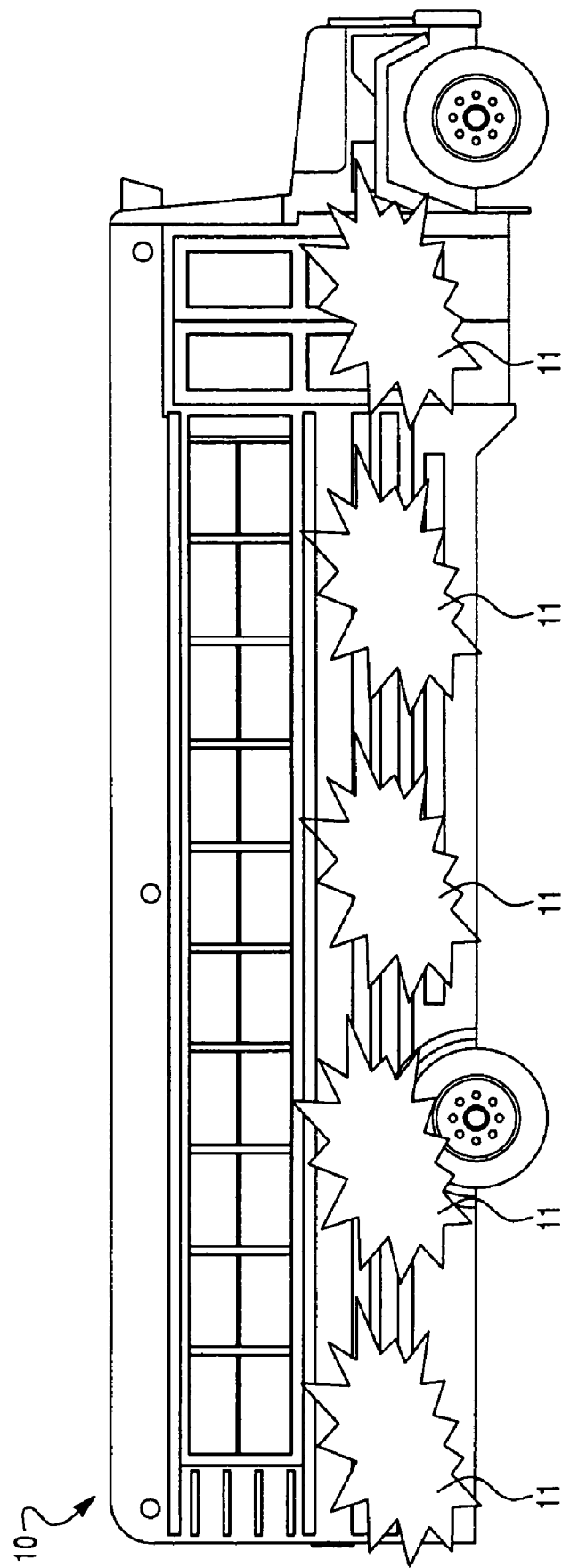
FIG. 1 is a side view of a bus with potential side collision locations illustrated according to an exemplary embodiment.

Referring to FIG. 1, a side view of a bus 10 is shown, according to an exemplary embodiment. In this particular illustration, the bus 10 is a Type C bus. According to other exemplary embodiments, the bus 10 may be any other kind of school, commercial, or motor-coach bus. Potential side collision areas are illustrated by a plurality of zones 11. A side impact collision may be caused by various events. For example, the bus 10 tipping on its side (e.g. a rollover) may trigger a side impact collision event despite no outside object coming in contact with the bus 10. A side impact collision may also be caused by various objects colliding with the bus 10, whether it be another vehicle, a projectile, etc.

A side impact collision may impact all or parts of the zones 11 depending on the type of collision and the colliding object. A side impact collision may impact the lower part of the vehicle, the upper part of the vehicle (including the windows in FIG. 1), or both. A side impact collision may impact various areas of the vehicle differently.

Figure 2:
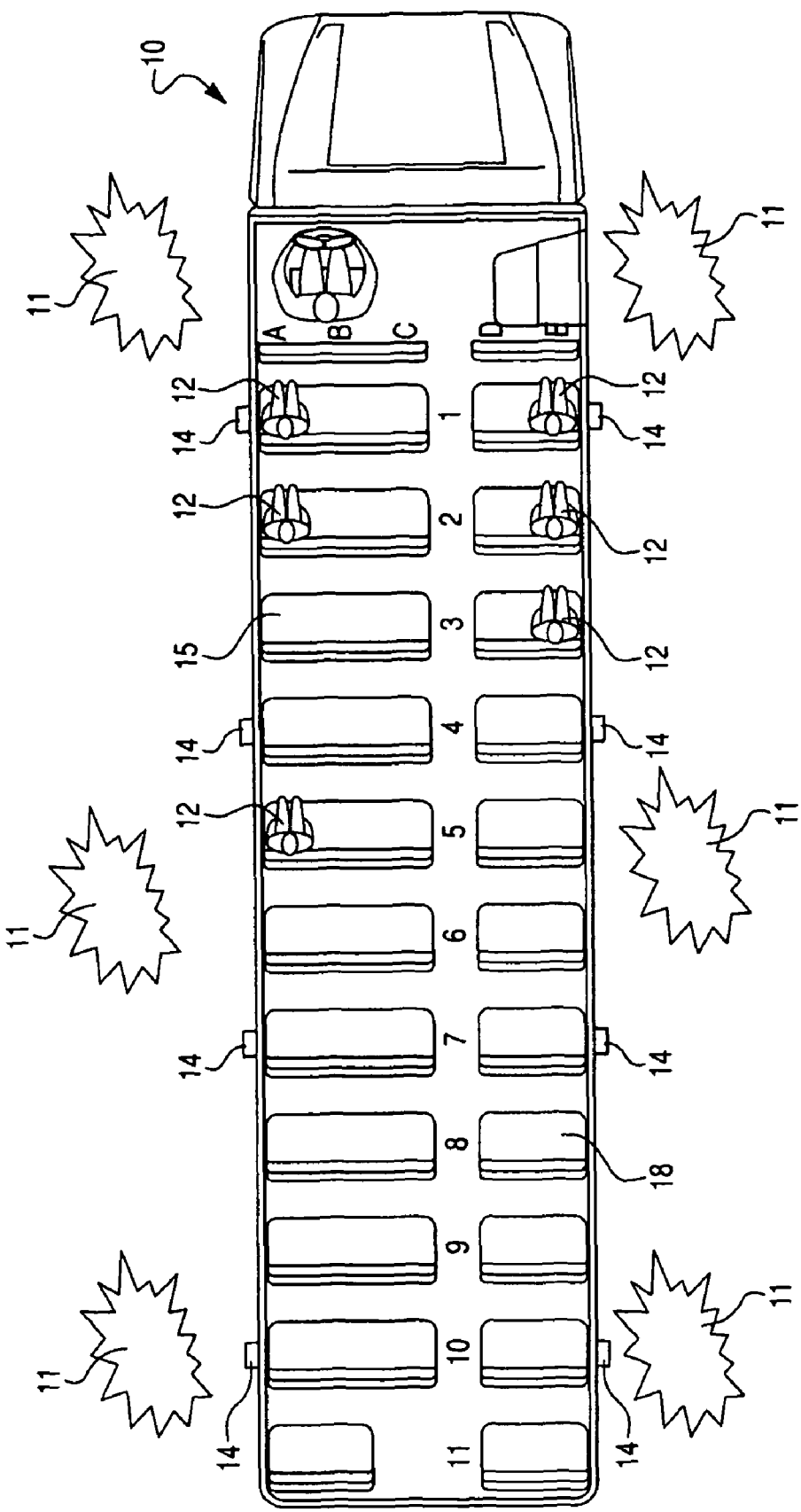
FIG. 2 is a top view of a bus with potential side collision locations illustrated according to an exemplary embodiment.

FIG. 2 is a top view of the bus 10, according to an exemplary embodiment. The bus 10 includes a plurality of seats 18 arranged in rows on either side of the bus 10. The seats 18 may be designed to hold a single occupant or multiple occupants, and may include restraints such as seatbelts to restrain an occupant in the seat.

A side collision in one of the zones 11 could impact the passengers 12 of the bus in a number of ways. A side impact collision may dislodge the passengers 12 from a seat without a seatbelt, and the passengers 12 may collide with the side of the bus, perhaps a window. In certain side impact collisions, the passengers 12 may be dislodged from their respective seats, and deployed curtain airbags may help reduce the chance of injuries caused by bodies becoming dislodged from their seat.

Various sensors 14 may be located around the bus 10, according to an exemplary embodiment. As shown, there are eight sensors 14 located around the bus 10. According to other exemplary embodiments, there may be more or fewer sensors 14 located on the bus 10, dependent upon the size of the bus 10, user preference, or other various criteria. The sensors 14 may be attached to an outer portion of the bus 10 or an inner portion of the bus 10. The sensors 14 detect a side impact collision with another object, or other vehicle movement indicating a collision or rollover event.

Figure 3:
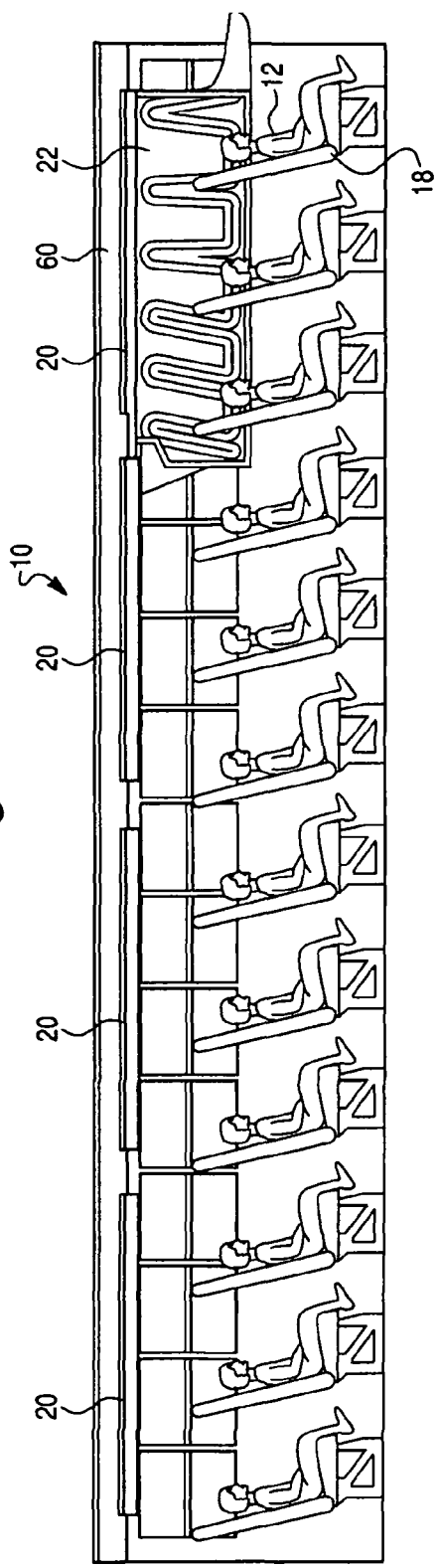
FIG. 3 is a side view of a bus interior with passengers and side curtain airbag modules according to an exemplary embodiment.

Referring now to FIG. 3, each of the sensors 14 may correspond to one or more curtain airbag modules 20 within the bus 10. The airbag module 20 is configured to deploy the curtain airbag 22 between an occupant 12 of the bus 10 and the side of the bus 10.

According to one exemplary embodiment, if a sensor 14 detects a side impact collision in a nearby zone 11, it may send a signal to deploy one or more of the curtain airbags 22 responsible for protecting the area represented by the sensor 14. In an alternative embodiment, every sensor 14 located on the bus 10 may correspond to the entire curtain airbag system which deploys all curtain airbags 22 when a collision is detected by at least one sensor 14. According to a preferred embodiment, each sensor 14 relates to a single curtain airbag 22 within the bus 10 that covers three rows of seats 18. According to other exemplary embodiments, the curtain airbag 22 may be designed to protect more or fewer passengers 12 and seats 18.

The curtain airbag module 20 is also shown in a stowed (i.e. the airbag 22 has not been deployed) state, according to an exemplary embodiment. The curtain airbag module 20 is shown attached to the bus 10 above the windows. According to other exemplary embodiments, the curtain airbag module 20 may be attached to the inner roof of the bus 10, in another location of the side wall of the bus 10, attached to an interior component/compartment of the bus 10, or attached to another object within the bus 10.

A single curtain airbag 22 may deploy while other curtain airbags 22 within the bus 10 remain stowed away, according to an exemplary embodiment. The decision to deploy one curtain airbag 22 while not deploying another curtain airbag 22 may be made using sensors 14 or all curtain airbags 22 may deploy simultaneously when a collision is detected at any point on the bus 10.

Figure 4:
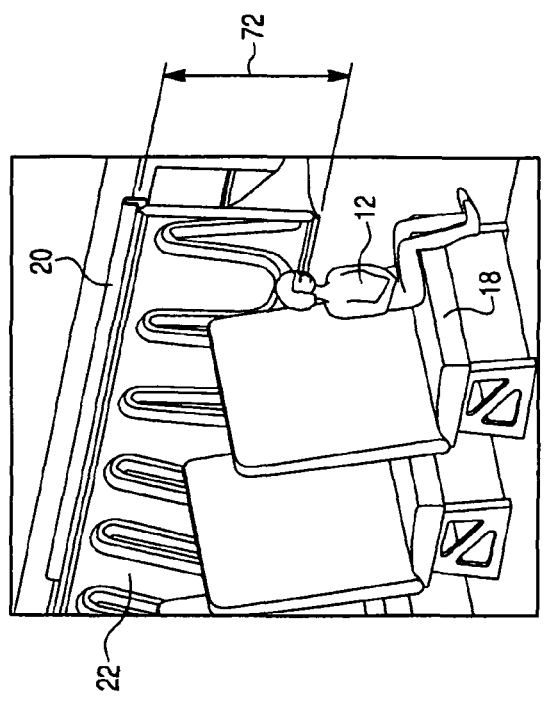
FIG. 4 is an isometric view of a bus interior showing a deployed side curtain airbag within the bus according to an exemplary embodiment.

Referring to FIG. 4, a view of a deployed curtain airbag 22 and affected passengers 12 and seats 18 is shown in greater detail, according to an exemplary embodiment. As illustrated, the curtain airbag 22 deploys over the windows of the bus 10 and protects the head of the passenger 12. According to other exemplary embodiments, the curtain airbag 22 may deploy to cover additional or fewer areas of the side of the bus 10, protecting more or less of the passenger 12 from the side impact collision. The deployment of the curtain airbag 22 may be altered due to interior geometry of the bus 10, interior design of the bus 10, or by other criteria related to the side impact collision or the bus 10. The design and structure of the curtain airbag 22 may be adjusted to accommodate buses 10 of various sizes and types.

Referring now to FIGS. 5-8 a side curtain airbag module 20 is shown according to an exemplary embodiment. The airbag module 20 includes an airbag 22, an inflator or gas generator 30 that produces a gas to inflate the airbag 22, and a trim component or trim cover 40 (e.g., cover, housing, shell, etc.) that surrounds and conceals the gas generator 30 and the airbag 22.

Traditionally, there are few options with regards to preexisting interior trim component in a large passenger vehicle, such as a bus 10. The trim cover 40 protects the airbag 22 from outside elements that may come into contact with the airbag 22, such as the passengers 12. The trim cover 40 is preferably formed as a unitary body with a uniform cross-section along its length. According to an exemplary embodiment, the trim cover 40 is formed as an extruded polymer body (plastic material). According to another exemplary embodiment, the trim cover 40 may be formed from another material such as aluminum. The trim cover 40 forms a first chamber 44 and a second chamber 46. The first chamber 44 receives the stowed airbag 22 while the second chamber 46 receives the inflator 30. As the inflator 30 generates gas to inflate the airbag 22, the airbag 22 expands. A door 45 is provided in the first chamber 44 to allow the airbag 22 to expand out of the first chamber 44 and into the space between the passenger 12 and the walls of the bus 10. According to one exemplary embodiment, as shown best in FIG. 5, the door 45 is hinged on one side (shown as exemplary schematically represented hinge 48) and is curled or folded to the inside of the module 20 to help retain the airbag 22 inside the housing 40 prior to deployment.

The airbag 22 is coupled to the trim cover 40 with an elongated member, such as a rod 50. The rod 50 supports the deployment of the airbag 22 by being coupled to the airbag 22 such that the airbag 22 does not detach from the airbag module 20 as the airbag 22 is deployed. According to an exemplary embodiment, the rod 50 may be a glass-filled nylon rod, a polymer rod, a metal rod, or a rod made of one or more various materials. The rod 50 may extend for the full length of each curtain airbag 22.

The rod 50 may be coupled to the airbag 22 in various ways. According to one exemplary embodiment, the airbag 22 includes one or more fabric tabs 24 formed into loops. The fabric tabs 24 may be formed from the same material as the airbag 22, a different fabric, or any other suitable material. The tabs 24 may be sewn to the airbag 22 or may be secured to the airbag 22 another way, such as with an adhesive or a mechanical fastener. The tabs 24 are coupled on both ends to the airbag 22 to form loops that receive the rod 50.

Figure 6:
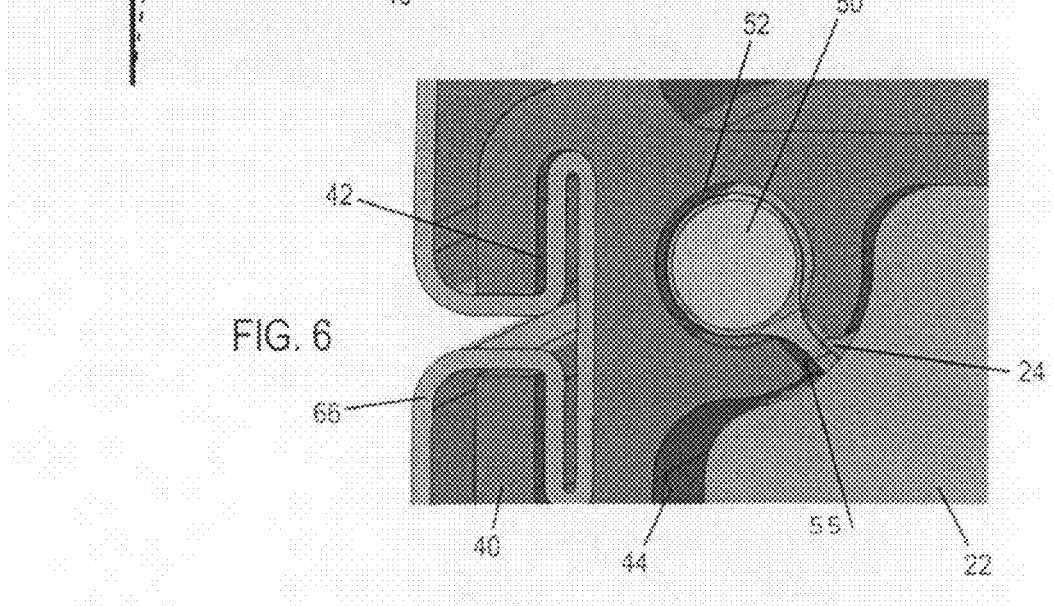
FIG. 6 is a detail isometric view of a portion of the side curtain airbag module of FIG. 3 according to an exemplary embodiment.

As shown best in FIG. 6, the rod 50 is housed in a third chamber 52. The third chamber 52 is connected to the first chamber 44 by a narrow slit or channel 55. The channel 55 is wide enough to receive the tabs 24 but is too narrow to allow the rod 50 to pass from the third chamber 52 to the first chamber 44. The force of the deploying airbag 22 forces the airbag 22 out of the first chamber 44, but the rod 50 is coupled to one end of the airbag 22 with the tabs 24 and therefore continues to keep the airbag 22 coupled to the airbag module 20 and, thus, maintains the airbag's 22 connection to the bus 10 during deployment.

According to one exemplary embodiment, the stowed to deployed height ratio of curtain airbag 22 is 0.51-0.8. The ratio between the height 70 of a stowed curtain airbag 22 (e.g., the height of the first chamber 44) (see FIG. 5) and the height 72 of a deployed curtain airbag 22 (see FIG. 4) is 0.51-0.8. This ratio may allow for optimized space management in a stowed state and an optimized protection radius in a deployed state in a bus 10. The 0.51-0.8 ratio is preferred for the unique nature of a curtain airbag 22 for a bus 10. According to other exemplary embodiments, other ratios of stowed curtain airbag 22 to deployed curtain airbag 22 may be preferred.

According to an exemplary embodiment, the airbag module 20 may be coupled to the inner wall 60 of the bus. Side walls of the bus adjacent a deployed curtain airbag have a vertical plane in a range of zero degrees to 10 degrees, such as shown by angle α in FIG. 5. According to other exemplary embodiments, the airbag module 20 may be attached to another component within the bus 10 (i.e., an overhead compartment). The airbag module 20 may be coupled to the bus 10 such that the cover 40 may not be removed from the outside of the airbag module 20, which can prevent tampering. As shown in FIGS. 5-8, the curtain airbag module 20 may be coupled to the bus 10 with brackets 32 and track members 66.

Figure 5:
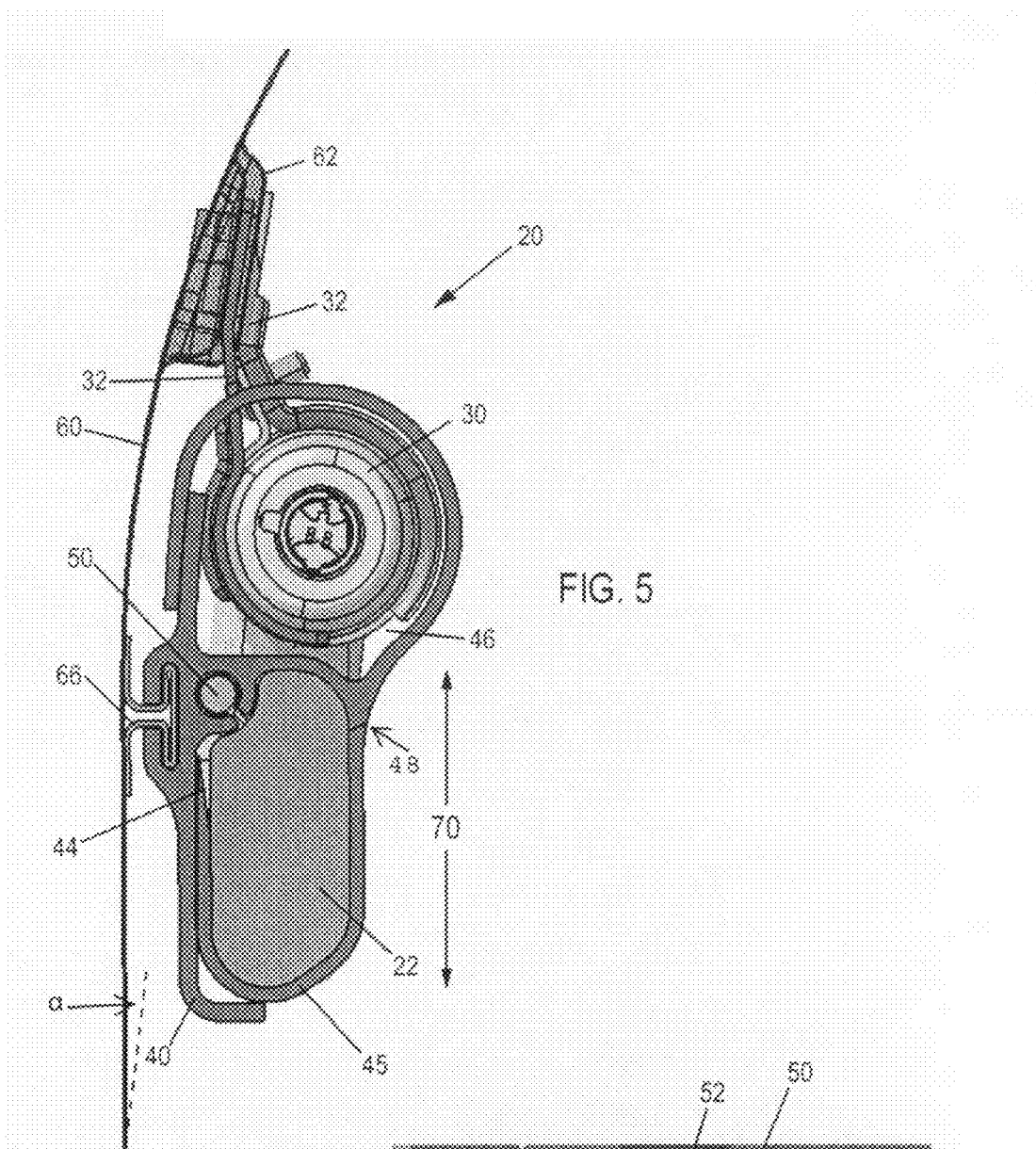
FIG. 5 is a side view of the side curtain airbag module of FIG. 3 according to an exemplary embodiment.
Figure 7:
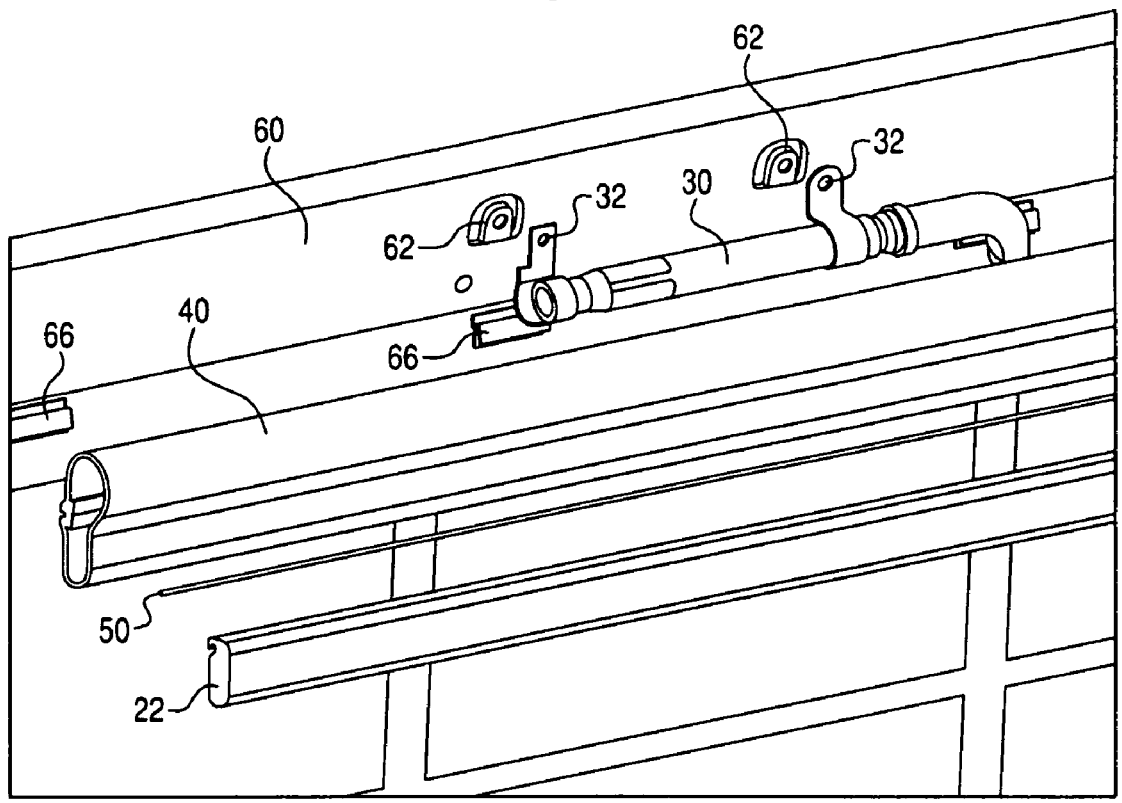
FIG. 7 is an exploded isometric view of the side curtain airbag module of FIG. 3 according to an exemplary embodiment.
Figure 8:
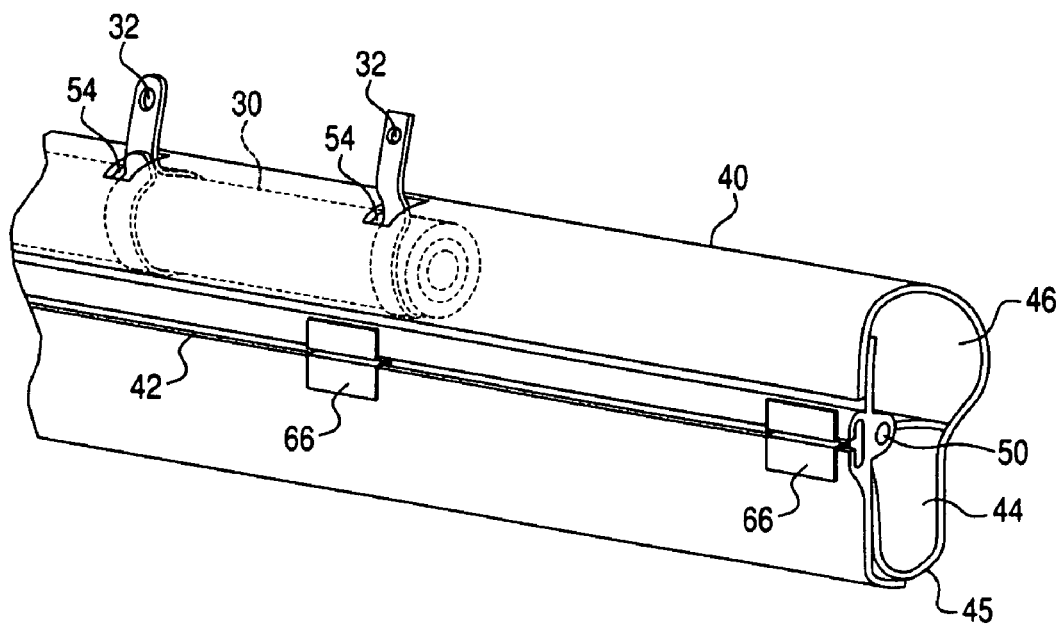
FIG. 8 is a partially broken rear isometric view of the side curtain airbag module of FIG. 3 according to an exemplary embodiment.

Referring especially to FIG. 7, a multitude of aligned track or rail members 66 are coupled to the inner wall 60 of the bus 10. According to an exemplary embodiment, the track members 66, may be coupled to the inner wall 60 with any suitable fastening mechanism such as welding, adhesives, threaded fasteners, rivets, etc. The track members 66 may be formed of metal or plastic or any other suitable material. Multiple track members 66 are coupled in line to form a track. According to an exemplary embodiment, the track members 66 have a generally I-shaped cross-section, as shown in FIG. 5. The track members 66 engage a similarly shaped groove or socket 42 formed in the trim cover 40. According to one exemplary embodiment, the airbag modules 20 may "slide" onto the track members 66 and be fastened in a number of ways (e.g. "locking" into place on the track). The socket 42 allows the airbag module 20 to be coupled to the inner wall 60 while still allowing the airbag module 20 to be slid down the track members 66. The track members 66 may allow for easy removal of the curtain airbag modules 20 by "sliding" the curtain airbag modules down the track members 66 and removing the modules 20 at one end of the track.

According to an exemplary embodiment, the track attachment may be a "slide and lock" track attachment. The installer of the side curtain airbag system may "slide" multiple airbag modules 20 onto the track (formed of track members 66), securing each airbag module 20 by placing them next to each other and securing the airbag modules 20 on the ends. The airbag modules 20 may be secured along the track by other means, according to other exemplary embodiments (e.g. securing a "stopper" on each end of an airbag module 20). The track members 66 and sockets 42 may have various forms besides the ones illustrated in FIGS. 5-8.

According to one exemplary embodiment, the airbag modules 20 are further coupled to the bus 10 with brackets 32. The brackets 32 (e.g., retainer fasteners) couple the inflator 30 to the inner wall 60 of the bus.

Referring to FIG. 7, an exploded view of airbag module 20 is shown according to an exemplary embodiment. The brackets 32 are shown coupled to the inflator 30. The inflator 30 may be used to support the airbag module 20. As shown best in FIG. 8, holes or openings 54 may be provided in the trim cover 40 to allow the brackets 32 to extend through the trim cover 40. The brackets 32 are coupled to the inner wall 60. According to one exemplary embodiment, the brackets 32 are coupled to the inner wall 60 at a series of raised bosses 62 with threaded fasteners. According to other exemplary embodiments, the brackets 32 may be coupled to the inner wall 60 of the bus 10 using various types of fasteners and/or adhesives. When the airbag module 20 is in a stowed state, the brackets 32 may be obscured from the view and/or reach of the passengers of the vehicle, preventing potential tampering. A maximum of two of the plurality of fasteners may be exposed to an interior of the bus.

Figure 9:
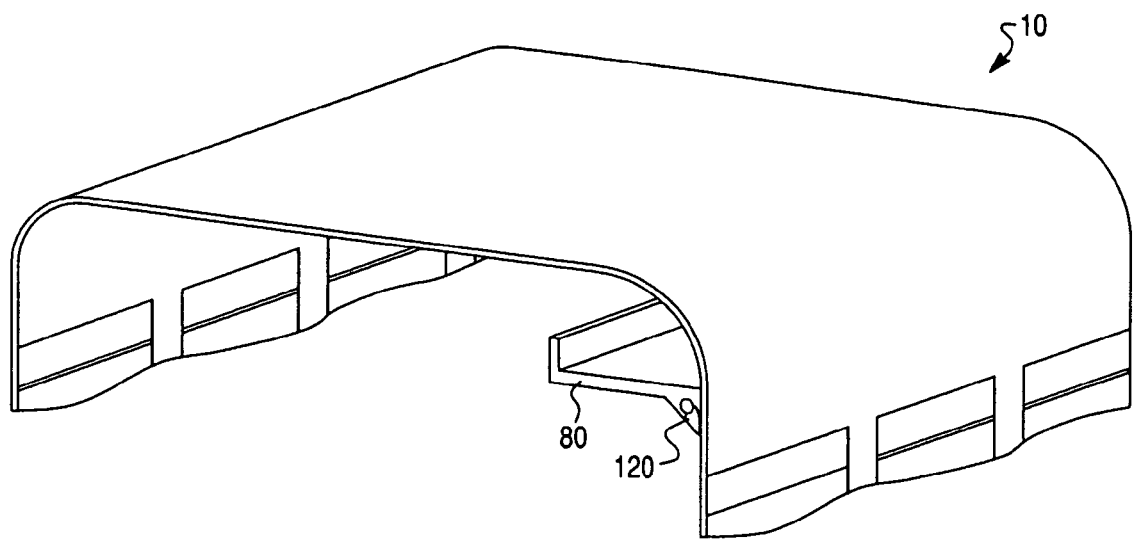
FIG. 9 is an isometric view of a portion of a bus including a side curtain airbag module coupled to an overhead compartment of the bus, according to another exemplary embodiment.
Figure 10:
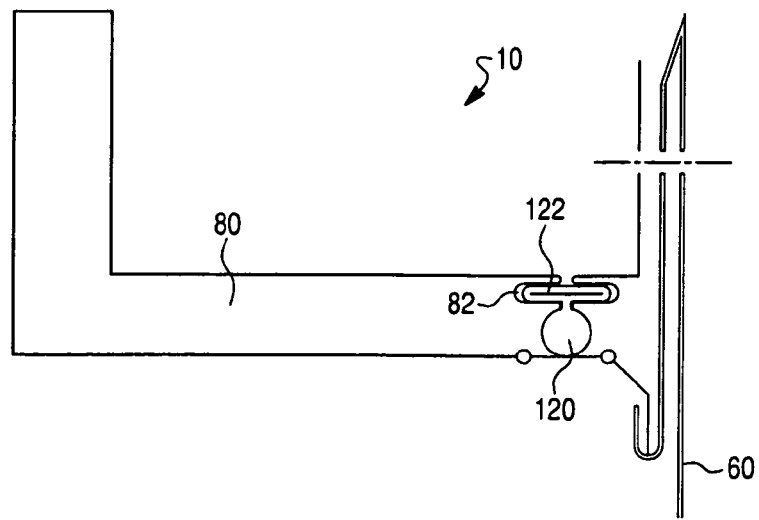
FIG. 10 is a cross-section view of the bus of FIG. 9 including a side curtain airbag module coupled to an overhead compartment of the bus, according to another exemplary embodiment.

Referring now to FIGS. 9-10, according to an exemplary embodiment, a side curtain airbag module 120 to be installed in a bus 10 may be coupled to an overhead compartment 80 instead of the inner wall 60 of the bus 10. An overhead compartment 80 is shown above the seats 18 of the bus 10. The airbag module 120 may be attached to the overhead compartment 80 proximate to the wall 60, according to an exemplary embodiment. According to an exemplary embodiment, the airbag module 120 includes a track member 122 that engages (e.g. "slides" into) a corresponding slot or socket 82 in the overhead compartment 80, similar to the engagement of track members 66 and groove 42 of the side-mounted airbag module 20. The curtain airbag module 120 deploys through a door or other opening in the compartment 80. The module 120 can be attached on the outside of the overhead compartment 80 or inside a cavity in a shelf portion of the overhead compartment 80.

Figure 11A:
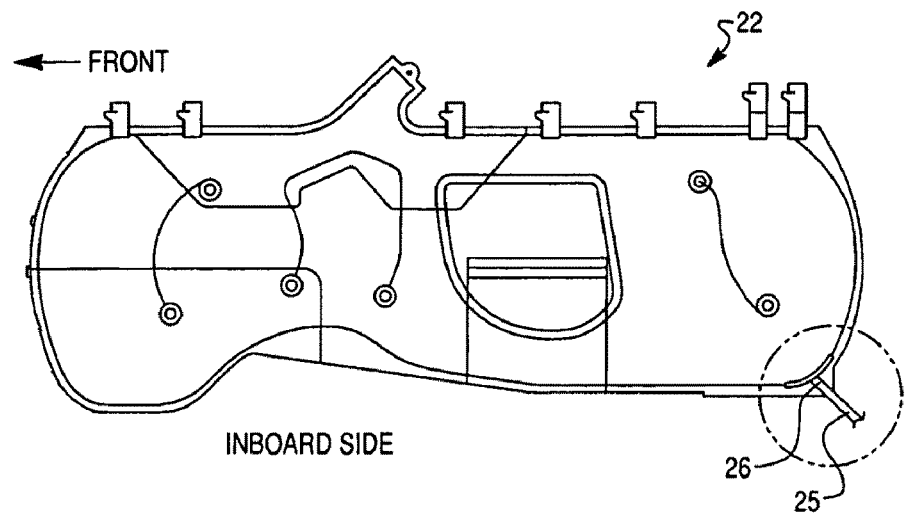
FIGS. 11A and 11B are front and rear elevation views, respectively, of a side curtain airbag including a tether according to another exemplary embodiment.
Figure 11B:
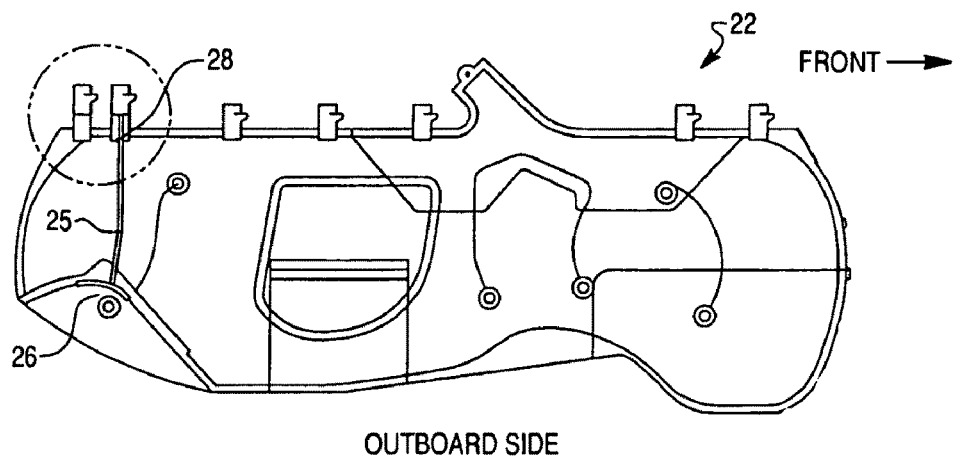

Referring to FIGS. 11A-11B, an airbag 22 is shown, according to another exemplary embodiment, with a tether 25. The tether 25 may be positioned on the outboard side of airbag 22 to aid in the deployment trajectory of the airbag module 20, by imparting a tension, which is substantially longitudinal to the tether 25, wherein the tension assists the airbag 22 to deploy substantially downward along and proximate to the window of the bus 10. The deployment trajectory of an airbag is critical to provide the maximum occupant protection during an impact or rollover event.

FIG. 11A shows the inboard side of the airbag 22 with a first end 26 of the tether 25 coupled to the airbag 22. The first end 26 of the tether 25 may be positioned substantially in the rear and proximate to the trailing edge of the airbag 22. The tether 25 may be sewn directly to the airbag 22. According to an exemplary embodiment, the tether 25 may be sewn to the corner of the curtain airbag 22 at a 45 degree angle, and may be attached or sewn at various depths into the curtain airbag.

FIG. 11B shows the outboard side of the airbag with the second end 28 of the tether 25 coupled to the airbag 22 in a manner similar to the first end. When both ends 26 and 28 of the tether 25 are coupled to the airbag 22, the tether 25 may be configured substantially vertical on the outboard side of the airbag 22.

When the impact event propels an occupant 12 into a substantially unfolded airbag 22, generating a lateral force onto the airbag 22, the tether 25 may provide tension in the airbag 22 to help the airbag 22 maintain a proper shape, covering the window. By maintaining proper shape, the airbag 22 may be more effective preventing the occupant from being ejected through the window, or impacting the window, during the impact event.

The curtain airbag 22 may have special markings when deployed, according to an exemplary embodiment. The airbag 22 may be labeled with arrows or signs regarding locations of exits on the bus 10. Using the labels on the curtain airbag 22, passengers 12 may egress the bus 10 in a more efficient manner. The curtain airbags 22 may be designed to be easily moved and/or taken down once they are deployed. Additionally, the curtain airbag modules 20 are positioned in the bus 10, such that when adjacent curtain airbags 22 deploy, the adjacent airbags 22 do not overlap each other (especially when the curtain airbags 22 are positioned adjacent a window).

Additionally, the trim cover 40 may include visual markings, such as painting or graphics, to create warning or exit signs. Additionally, the trim cover 40 may include markings to improve the appearance of the trim cover 40, such as with grain markings.

Figure 12:
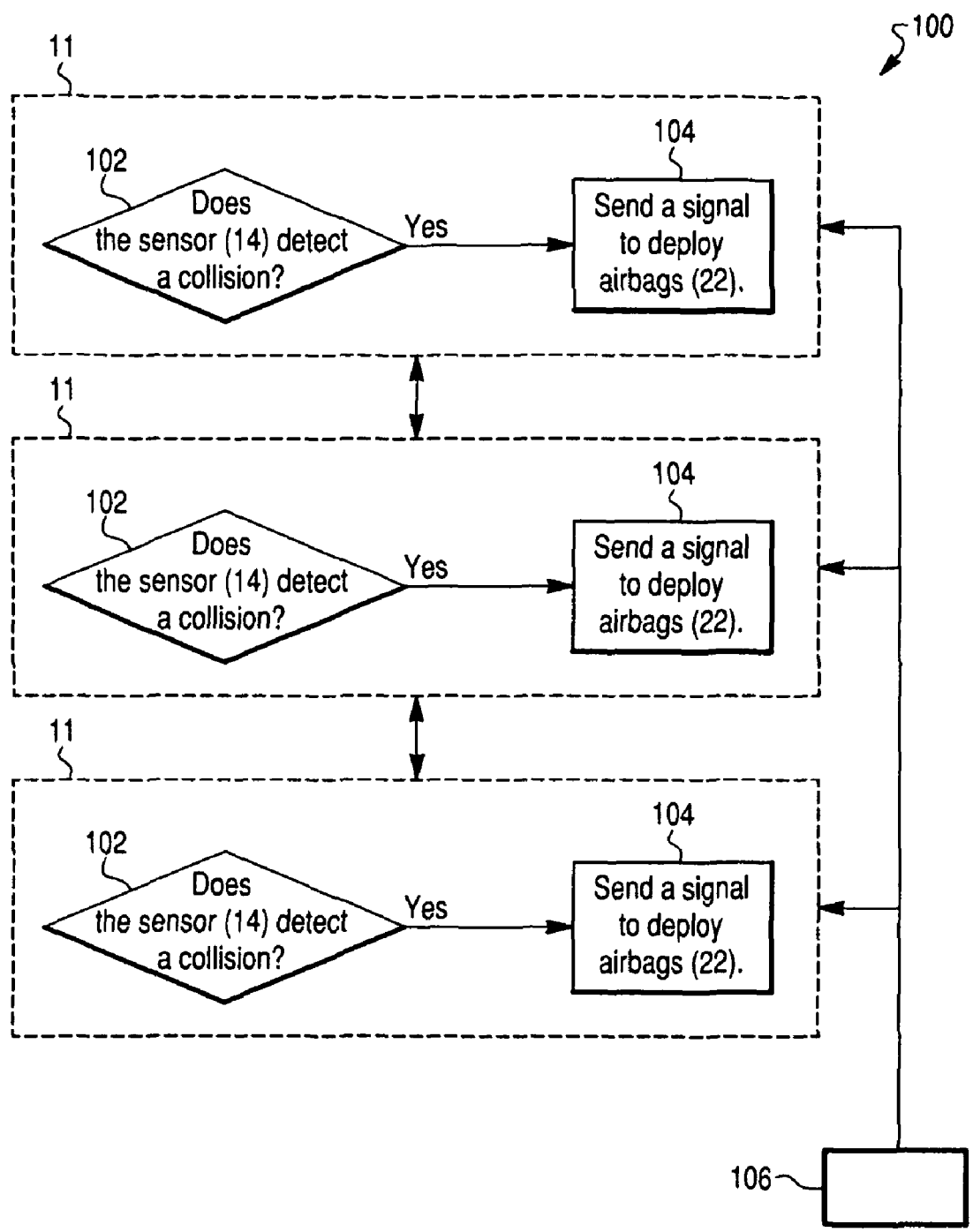
FIG. 12 is a block diagram of a method for determining whether to deploy a side curtain airbag, according to an exemplary embodiment.

Referring to FIG. 12, a flow diagram of a process 100 of deploying curtain airbags 22 of a curtain airbag system is shown, according to an exemplary embodiment. As described earlier, zones 11 may be located in various locations along the side of the bus 10. According to an exemplary embodiment, each individual sensor 14 on the bus 10 may correspond to a single zone 11.

Each zone 11 may be independently monitored for collisions. Each individual zone 11 continuously detects for collisions using the appropriate sensor(s) 14 (step 102). The curtain airbag system remains idle as long as no collision is detected in any zone 11. If a collision is detected in a particular zone 11, the curtain airbag system in the particular zone 11 then deploys, via a control module or controller, the curtain airbag 22 for the particular zone 11 (step 104). The information may be relayed to other zones 11 to supplement a decision for the particular zone 11. The information may also be relayed to a central location, such as a central processing unit 106 for the curtain airbag system 100, if desired.

It is important to note that the construction and arrangement of the side curtain airbag module as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. A curtain airbag module for a bus, comprising:
   a curtain airbag;
   a trim cover to prevent objects in a passenger compartment of the bus from contacting the curtain airbag in a stored state;
   a plurality of fasteners to attach the curtain airbag module to an interior bus component or side wall of the bus;
   an inflator to inflate the curtain airbag; and
   a rod,
   wherein the trim cover includes first and second chambers, the first chamber is configured to contain the curtain airbag in the stored state and the second chamber is configured to contain the inflator,
   wherein the curtain airbag includes fabric tabs to connect the curtain airbag to the module, and
   wherein the fabric tabs are connected to the rod to mount the curtain airbag in the module.

2. The curtain airbag module of claim 1, wherein a maximum of two of the plurality of fasteners are exposed to an interior of the bus.

3. The curtain airbag module of claim 1, wherein the rod is formed of glass-filled nylon, metal, or plastic.

4. The curtain airbag module of claim 1, wherein the rod extends a full length of the module.

5. The curtain airbag module of claim 1, further comprising a tether configured to maintain a position of the curtain airbag during impact.

6. The curtain airbag module of claim 1, wherein a ratio of stowed curtain airbag module size to filled curtain airbag coverage height is in a range of 0.51 to 0.8.

7. The curtain airbag module of claim 1, wherein the trim cover includes an opening for an inflator retainer fastener to extend through.

8. The curtain airbag module of claim 1, wherein the trim cover has a uniform cross-section.

9. The curtain airbag module of claim 1, wherein the trim cover is formed of an extruded plastic material.

10. A bus, comprising:
    a plurality of seats;
    a plurality of curtain airbag modules, the modules each including a curtain airbag, an inflator, and a trim cover to prevent objects in passenger compartment of the bus from contacting the curtain airbag in a stored state,
    wherein the trim cover includes a socket configured to couple with at least one track member.

11. The bus of claim 10, wherein each of the plurality of curtain airbag modules are configured to deploy to cover at least three rows of seats.

12. The bus of claim 10, further comprising a control module configured to selectively deploy one or more of the plurality of curtain airbag modules based on information from one or more sensors.

13. The bus of claim 12, wherein the bus includes a plurality of collision zones.

14. The bus of claim 13, wherein the control module deploys the one or more curtain airbag modules in one or more of the plurality of zones in the bus.

15. The bus of claim 10, wherein the plurality of curtain airbag modules are mounted to a roof of the bus, a side wall of the bus, or an interior compartment of the bus.

16. The bus of claim 10 wherein side walls of the bus adjacent a deployed curtain airbag have a vertical plane in a range of zero degrees to 10 degrees.

17. The bus of claim 10, wherein the at least one track member is attached to an inner wall of the bus.

18. The bus of claim 10, wherein the socket is configured to slidably connect to the at least one track member.

19. A bus, comprising:
    a plurality of seats;
    a plurality of curtain airbag modules, the modules each including a curtain airbag, an inflator, and a trim cover to prevent objects in passenger compartment of the bus from contacting the curtain airbag in a stored state,
    wherein the plurality of curtain airbag modules are mounted to an overhead storage bin, each module including a track member that engages a socket in the overhead storage bin.

20. The bus of claim 19, wherein each of the plurality of curtain airbag modules are mounted within the overhead storage bin.

* * * * *